May 31, 1960
C. F. WAHLIG
2,939,029
METHOD OF IMAGE STORAGE AND RELEASE
Filed Dec. 8, 1958
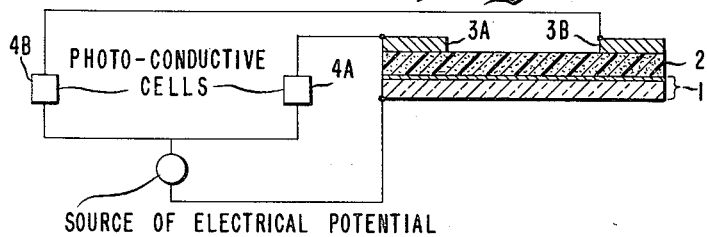
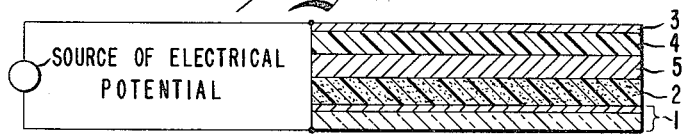
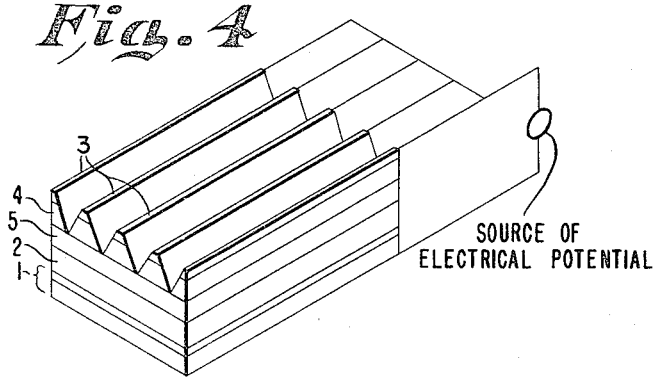
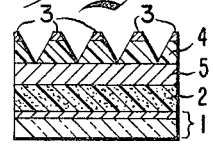
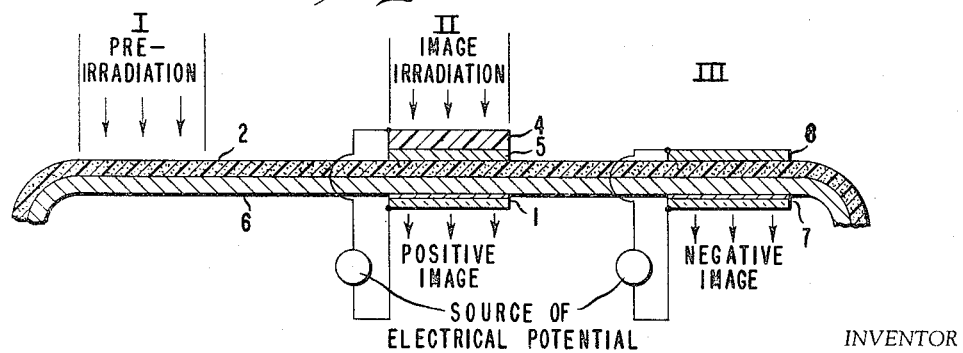
INVENTOR
CHARLES FREDERICK WAHLIG
BY Lynn Barrett Morris
ATTORNEY United States Patent Office 2,939,029
Patented May 31, 1960

2,939,029

METHOD OF IMAGE STORAGE AND RELEASE

Charles Frederick Wahlig, Claymont, Del., assignor to E. I. du Pont de Nemours and Company, Wilmington, Del., a corporation of Delaware Filed Dec. 8, 1958, Ser. No. 778,942

4 Claims. (Cl. 313—108)

This invention relates to methods for image storage and release. More particularly it relates to methods for image storage and release utilizing an image storing phosphor and photoconductors.

The storing and release of information, using phosphors, has now been accomplished in at least five different ways. These include the infrared stimulation of stored excitation energy (U.S. Patent 2,742,631, J. A. Rajchman et al.), the optical formation and thermal dissociation of F′-centers in alkali-halides, the persistent internal polarization produced by combined optical and electrical excitation of phosphors (H. Kallmann and B. Rosenberg, Physical Review, vol. 97, pp. 1596–1610, March 15, 1955), the feedback-type electroluminescent phosphor-photoconductor light amplifier (Proc. Inst. Radio Engrs., Dec. 1955, pp. 1888–1896), and the storage system described in assignee's Wahlig U.S. application Ser. No. 595,712, filed July 3, 1956. The last mentioned is the only method of the five that is both rapid and operative in ambient light.

The application of Wahlig discloses a process of imposing an image upon a zinc sulfide or zinc cadmium sulfide phosphor containing up to about 7 mol percent cadmium based on the total amount of zinc and cadmium present, said phosphor containing activating manganese in an amount of from about 0.2 to about 2 percent by weight of said metal sulfide. The image is imposed, i.e., the phosphor is made to receive the image, by subjecting the phosphor to excitation radiation (of wave length shorter than about 500 millimicrons) while the phosphor is within an electric field of a strength of less than about 500,000 volts per centimeter. Release of the stored image is obtained by subsequently subjecting the phosphor to an electric field of a strength of at least as great as and preferably greater than that of the first-mentioned field. The storage element used in the Wahlig process may be in the form of a transparent, flexible tape bearing a layer of a binding material containing the phosphor. In another embodiment, Wahlig discloses that the phosphor in the binder layer can be shielded from external blue and ultraviolet electromagnetic radiation by a suitable filter dye which may be in said layer or in separate layers on each side of said layer, said filter dye permitting the transmission of X-rays.

In the present invention a photoconductor is employed to control the electric field applied to a manganese activated zinc sulfide phosphor of the type described by Wahlig. The physical structure of an inflexible form of the resultant storage element may be identical to that of a lamp amplifier, e.g., British Patent 713,916, which discloses that a light amplifying cell can be prepared in which a photoconductive substance can be superposed on a layer of an electroluminescent phosphor, the superposed layers being located between laminar electrodes capable of transmitting light. The electroluminescent phosphor disclosed is a mixture of zinc oxide and zinc sulfide activated by copper or lead. The Wahlig application, previously described, teaches that if about 0.2 to about 2 percent manganese by weight based on zinc sulfide is present in the phosphor, no electroluminescence results. At such manganese concentrations the phosphors are properly described as electrophotoluminescent, as defined, for example, by G. Destriau and H. F. Ivey, Proc. Inst. Radio Engs., Dec. 1955, pp. 1929–1940.

The term "photoconductive" as used herein refers to materials that possess the property of varying their electrical conductivity under the influence of light.

The term "storage phosphor" refers to those phosphors capable of storing irradiated energy and releasing it in whole or in part at a subsequent time.

As used herein, "image" is intended to mean any record, signal, etc., whether it be in the shape of a single small dot or a multiple of dots, squares, or other geometric form or pattern, a uniform exposure over the entire surface of the luminescent material, or a pattern, design, or picture caused by exposing selected portions of a luminescent layer. The configuration of the image is not critical.

An object of this invention is to provide a method for image storage and release. Another object is to provide a method for image storage and subsequent release of a negative image. Another object is to provide a method for image storage and release wherein the image storing element is an inflexible sandwich structure. A further object is to provide a method for image storage and release wherein the image storing element is in the form of a flexible tape and the process is carried out in three stages with the transportation of the tape to three locations by suitable means. Other objects will appear hereinafter.

These objects are accomplished by the following invention which is a method for image storage and release which comprises pre-irradiating uniformly or in pattern a layer of storage phosphor in a binder material which is connected in series with a photoconductive cell to a power source, subsequently discharging from the phosphor a part of the pre-irradiated stored energy by irradiating the photoconductive cell, and thereafter increasing the applied voltage causing a release of the remaining stored energy from the phosphor in the form of a negative image of the pattern of irradiation incident on the photoconductive cell.

The invention will now be specifically described with reference to the accompanying drawings wherein:

Figure 1 is a diagrammatic view, with an electroluminescent element in section, of a simple apparatus suitable for carrying out the method of the invention.

Figure 2 is a diagrammatic view in section of an inflexible sandwich-structure apparatus suitable for carrying out the method of the invention.

Figure 3 is an end view in section of the structure shown in Figure 2.

Figure 4 is a top view of the structure shown in Figure 2.

Figure 5 is a diagrammatic view of an apparatus utilizing a flexible tape suitable for carrying out the method of the invention.

Similar reference characters have been used for similar elements throughout the drawings as far as practicable.

Figure 1 illustrates an apparatus for carrying out the invention in its simplest form wherein a layer of glass upon which an electrically-conductive coating has been deposited, hereinafter known as the transparent electrode 1 is coated uniformly with a resin binder 2 containing a storage phosphor. Two electrodes 3A and 3B are applied to the phosphor binder layer 2 and each is connected to a separate photoconductive cell 4A and 4B. The photoconductive cells are then connected to a power source through a single conductor and the power source is also connected to the transparent electrode 1. An alternating current is applied to the system with identical potential across each electrode 3A and 3B. The phosphor-binder layer 2 is uniformly irradiated through the transparent electrode 1 by an outside source of electromagnetic energy. Subsequently, one of the photoconductive cells is irradiated with an outside source of electromagnetic energy which will cause a discharge of light from the phosphor-binder layer 2 through the transparent electrode directly beneath the corresponding electrode (e.g., if 4A is irradiated the area beneath 3A will discharge light). Thereafter, the voltage across the system is increased (e.g., by a factor of 2) and the phosphor-binder layer will again discharge light but this time from the area beneath the other electrode (e.g., if area beneath 3A discharged when 4A was irradiated, area beneath 3B will discharge light on the subsequent increase in voltage).

Figure 2 illustrates an inflexible sandwich structure apparatus for carrying out the invention. The transparent electrode 1 is coated uniformly with a resin binder 2 containing a storage phosphor. An opaque current-diffusing layer 5 was coated on the phosphor binder layer with a grooved, photoconductive layer 4 bonded over the opaque layer 5. The top of the grooves of layer 4 are in effect silver lines 3 several mils wide which connected to a common terminal serve as the top electrode for the device.

Figures 3 and 4 are end and top views of the same structure serving to better illustrate it. While applying a potential across the structure the entire phosphor binder layer 2 is irradiated through the transparent electrode 1. Thereafter, a selected area of the photoconductive layer 4 is irradiated and the corresponding phosphor area emits a discharge of yellow light. After a storage time, the voltage is increased which causes a flash from the phosphor layer that is more intense from the areas not discharged earlier by irradiation of the photoconductive layer. For example, if after pre-irradiation of the phosphor with white light an image (with contrasting tones) is irradiated on the photoconductive layer, the phosphor binder will emit a flash which will be identical to that image. Afterwards, an increase in potential across the structure will cause the phosphor to emit another flash but this time it will be a negative of the original image.

Figure 5 illustrates the preferred apparatus for carrying out the invention which utilizes a flexible tape and device for its transportation to three locations. A thin transparent or translucent tape 6 is coated uniformly with a resin binder 2 containing a storage phosphor. The tape so coated is attached to a drive apparatus so that it can be easily transported from place to place. At the first location I, a specific area of the coated tape is pre-irradiated uniformly; this area is then transported to a second location II where the following elements are employed. Over the pre-irradiated area on the phosphor binder coated tape and in contact with it is placed a sandwich structure of similar areas which consists of an opaque, current-diffusing layer 5 with a grooved photoconductive layer 4 thereover. The grooved photoconductive layer is substantially identical to the one shown in Figs. 2, 3 and 4 complete with the silver line electrodes on top of the grooves connected to a power source. Beneath the pre-irradiated area on the tape and in contact with it is placed a transparent electrode 1 of similar area which is also connected to the power source. During this period of contact a D.C. biased A.C. potential is applied and an image is irradiated on the photoconductive layer. Thereupon, the storage phosphor emitted a flash in the form of a positive image viewed through the glass layer 1. The tape is then moved to a third location III where the selected area is placed between an electrode 8 and a transparent electrode 7, being in contact with both. An increased potential is applied across layers 7 and 8 and a visible flash was emitted by the storage phosphor which was observed to be a negative image of that seen at the second position II being an electrical discharge of the remaining stored energy.

The phosphor storage element preferably is in the form of a flexible tape comprised of perforated polyethylene terephthalate, e.g., 2 mils thick, having coated thereon a thin layer of a vinylidene chloride copolymer as described by Alles et al. in U.S. Patent 2,627,088, to which is applied a dispersion of manganese-activated (0.8% by weight) zinc sulfide phosphor in a chlorosulfonated olefin addition polymer (see Examples XX and XVIII of the application of assignee's Wahlig application, Ser. No. 595,712, filed July 3, 1956). The above-described flexible storage element is preferably utilized continuously by transporting the element, by a mechanically operated belt system or other transporting device known in the art, successively to three locations as follows where:

(1) A selected area of the tape is exposed to an ultraviolet light source (uniform fluorescent yellow-orange light is emitted), after passing through a dark area;
(2) The selected area of the tape is placed in contact with a like area of an inflexible, photoconductive CdS powder layer, covered with an opaque, current-diffusing layer of conductive CdS powder (see Example II of this application) and a D.C. biased A.C. potential (see Example II) is applied across the various layers electrically in series with one another and an image is irradiated on the photoconductive layer (The storage phosphor emits a flash of yellow-orange light in the form of a positive image);
(3) The tape alone is placed in a D.C. biased 400 cycles per second electric field greater than the field it experienced at location (2); a yellow-orange light flash is observed, i.e., remaining stored energy is released as a negative image of the pattern of light incident on the photoconductive power layer at location (2). During this process stray light of wave length longer than 500 millimicrons can be tolerated at all locations except that stray light of these wave lengths might affect the photoconductor at location (2) and should be avoided. A significant advantage of this process is that the image which is released at location (3) may be observed in ordinary room light filtered, e.g., by a Wratten No. 8 (K2) filter.

The zinc sulfide-manganese type phosphors are prepared by firing pure zinc sulfide with 0.2 to 2 percent by weight of a manganese activator compound by procedures known in the art to give a storage phosphor that is not electro-luminescent. The other raw materials are commercially available.

*Example 1*

Finely powdered zinc sulfide phosphor containing 0.8% by weight manganese was mixed with a high-dielectric constant thermosetting urea-formaldehyde/alkyd resin binder in the ratio of 0.26 gram of phosphor per ml. of binder. The slurry was then coated on a piece of transparent electrically-conductive glass. After the coating was thermoset at 80° C., the layer thickness was measured and found to be 8 mils and the coating weight of phosphor calculated to be 15 mg./cm.$^2$. Two 1.5 cm. square electrodes were then painted on the surface of the binder using an electrically conductive silver paint containing finely divided silver particles (99%+pure), and a CdS crystal photoconductive cell was connected electrically to each electrode forming two storage phosphor-photoconductor combinations in parallel with one another. The CdS cell has a minimum sensitivity of 2 microamperes/foot candle measured with 2870° K. color temperature tungsten radiation and an applied D.C. potential of 100 volts. The CdS crystal of the photoconductive cell covers an area of 2 square millimeters, the cell having a dark resistance minimum of 1000 megohms and an operating temperature of −80 to 100° C. and is manufactured by the General Electric Company. In a darkened room, the same potential of 500 volts, 1000 cycles per second was applied across the storage phosphor-photoconductor units. The two phosphor areas were then exposed uniformly for 10 seconds to an ordinary flashlight beam. Thirty seconds later the beam of the same flashlight was directed at one of the photoconductive cells described above, whereupon the phosphor area in series with it emitted a flash of yellow light. This represented a discharge of most of the energy absorbed and stored by the storage phosphor as a result of its earlier irradiation with the flashlight beam. After a subsequent storage time of ten seconds, the applied voltage was suddenly increased by 3 decibels (a factor of 2), and a yellow-orange flash was emitted solely by the phosphor element that still contained its original stored energy, that is, the one that had not been previously discharged by light striking the photoconductor in series with it.

*Example II*

A layer of the zinc sulfide-manganese (0.8% by weight) slurry described in Example I was coated on transparent glass upon which an electrically-conductive coating had been deposited to produce a thickness of 2 mils after thermosetting. In place of the cadmium sulfide crystal photoconductive CdS powder layer was prepared according to the method of B. Kazan and F. H. Nicoll, Proc. Inst. Radio Eng. 43, 1888–97 (Dec. 1955). An opaque, current-diffusing layer of conducting CdS powder described in the Kazan et al. article was then bonded between the storage phosphor layer and the grooved photoconductive layer, forming a three layer structure. To this unit, additive A.C. and D.C. electric fields were applied as described by B. Kazan in Am. J. Roentgen and Radium Therapy Nuclear Med. 79, 709–19 (April 1958) to obtain a more sensitive response of the powder photoconductor to light than is possible with an A.C. voltage alone. Using a 300 volt D.C. battery in combination with a 600 volt, 400 cycles per second A.C. source of power, an operative procedure similar to that described in Example I was carried out. With such a field applied, the entire phosphor layer was irradiated with white light, the opaque current-diffusing layer preventing exposure of the photoconductor. Thereafter, a selected area of the photoconductor was exposed to white light, and the corresponding storage phosphor area was observed to emit a flash of yellow light. After a storage time of one minute in the dark, the A.C. electric field was increased by 2 decibels (58%), and an overall flash of yellow light was observed, said flash being more intense from the storage phosphor area that had not been discharged earlier by light incident on the photoconductive layer. A negative image of the pattern of light incident on the photoconductive layer was thus observed after a storage time of one minute.

*Example III*

A storage element in the form of a tape, bearing a thin coating of storage phosphor in a dry binder material was prepared as described in Example XX of assignee's Wahlig, application, Ser. No. 595,712, filed July 3, 1956, except that the dry film thickness produced was 2 mils. The tape was then attached to a power driven belt type apparatus designed to transport the tape successively to three locations. At the first location a selected area of the tape approximately 2.0 cm. square was exposed uniformly to an ultraviolet lamp source, whereupon it emitted yellow-orange light. Between the first and second locations the selected phosphor area entered darkness, and the luminescence under ultraviolet excitation was observed to subside after a short period of phosphorescence. At the second location the selected area of the tape was brought into contact with a similar area of a grooved, photoconductive CdS powder layer, covered over by an opaque, current-diffusing layer of conducting CdS powder both of which were prepared as described in Example II. During this period of contact, a D.C. biased A.C. electric voltage similar to that described in Example II was applied across the combination of the storage phosphor layer, the current-diffusing layer, and the photoconductive powder areas, electrically in series with one another. Furthermore, said A.C. electric field was modulated at the time by a pattern of visible light incident on the photoconductor. Thereupon the storage phosphor was observed to emit a flash of yellow-orange light in the form of a positive image. At the third location the tape by itself was subjected to a D.C. biased 400 cycles per second electric field greater than that applied across the tape at the second location. A yellow-orange light flash was observed, resulting from the electrical discharge of the remaining stored energy as a negative image of the pattern of light incident on the photoconductive powder layer at the second location.

The invention process utilizes a luminescent phosphor storage element either of the flexible tape type as described in assignee's Wahlig application, Ser. No. 595,712, filed July 3, 1956, or of the inflexible, sandwich structure type comprising a glass plate coated with an electrically-conductive layer and transparent to visible light, a layer of luminescent storage phosphor in a binder material, an opaque-diffusing layer, a photoconductive layer, and a glass plate coated with an electrically-conductive layer and transparent to electro-magnetic radiation capable of exciting photoconduction.

The luminescent storage phosphors are prepared by methods known in the art. According to one such method, luminescent-pure zinc sulfide or a mixture of zinc sulfide and cadmium sulfide is dried together with the desired amount of manganese and halide flux and then calcined at an elevated temperature, after which it is washed, dried and sieved. The sulfides must be of a high order of purity and can be obtained by precipitation from solutions as described in U.S. Patent 2,805,917 to Nitsche. The manganese can be conveniently introduced in the form of compounds of manganese, such as $MnCl_2$, MnS and $MnSO_4$. The phosphor preparation can take place in the presence of a suitable flux, such as $BaCl_2$, $CaCl_2$, NaCl, $NH_4Cl$, NaBr, $SrCl_2$, $MgSO_4$ or mixtures of such compounds, or in the absence of a flux, as is well known in the art.

Firing for 30 minutes or longer at temperatures above 550° C. will produce the luminescent phosphor, which may be of a cubic or hexagonal crystalline structure, with the cubic structure preferably predominating. Firing may be followed by a wash with water, HCl, KCN or other known rinsing solutions, after which the phosphor material can be dried and sieved.

In the preferred embodiment of the process, wherein the phosphor material is in the form of a layer, and in the storage element of this invention, the phosphor layer is joined to a base support as illustrated in Example III. The base support is preferably flexible and may consist of such well known film-forming materials as cellulose derivatives, e.g., cellulose nitrate, cellulose triacetate, cellulose propionate, cellulose acetate butyrate; polyvinyl chloride, polyvinyl chloride/acetate; polyamides; polyvinyl acetals, e.g., from formaldehyde and acetaldehyde; super polyesters from dicarboxylic acids and dihydric alcohols, e.g., oriented sheets of polyethylene terephthalates having melting points above 200° C. The latter is the preferred support material because of its strength, stability and other desirable physical properties. Other suitable supports are paper, glass, metals, closely woven fabrics, etc.

As used herein, the expressions "element" and "storage element" are intended to mean any article comprising the phosphor storage material according to this invention. The terms specifically include self-supported phosphor-binder layers, as well as layers of the phosphor material, with or without binder, adjacent and/or joined to base supports, which may be flexible or inflexible, flat or otherwise shaped, e.g., sheets, plates, screens, strips, bands, wires, panels, drums, disks, belts, etc. The precise shape of the image storage element is not critical and will be determined by the desired use. The preferred storage elements are thin, narrow, long elements herein referred to as tapes. For convenience in handling or conveying, the element in tape form may be perforated along one or both edges, as will be known to persons skilled in the art. The base support, however, as indicated above, need not be flexible and can consist of a glass plate coated with an electrically-conductive material and transparent to the emitted yellow-orange light. In the case where the information is in the form of X-rays incident on the element, an optically opaque plate can be used as a base for the photoconductor. The photoconductive material should be selected on the basis of its X-ray absorption properties, e.g., CdS is excellent, and its thickness should be relatively greater than for optical excitation. The bonded current diffusing layer should be relatively opaque to X-rays, rather than to visible electromagnetic energy, so as to prevent the incidence of the X-rays upon the storage phosphor. Such X-rays would tend to store energy in the storage phosphor at a time when discharge of energy is desired.

The above-described storage elements are pre-irradiated uniformly or in a pattern using a radiation source. The simplest method of pre-irradiating the flexible tape form is to expose it to a source of ultraviolet light without applying an electric field or using any electrodes. It is necessary at the stage of the process where information is recorded on the tape to have adjacent to it a photoconductive layer, similar to that described above, utilized with the inflexible, sandwich-type structure and in addition, two electrodes which while they need not be transparent to the emitted light, the electrode adjacent to the photoconductive layer should be transparent to electromagnetic radiation that is capable of exciting photoconductivity.

The pre-irradiation sources include: electromagnetic radiation of a wave length shorter than about 500 millimicrons, e.g., visible blue light, ultraviolet radiation, X-rays, gamma rays and radio-active alpha and beta sources. Excitation radiation does not include electric fields or electromagnetic radiation of wave length longer than about 500 millimicrons, such as infrared radiation, since the phosphor utilized in this process is not excitable by these means. As mentioned previously the pre-irradiation is generally uniform but this is not necessary. Non-uniform pre-irradiation can be utilized to modulate or weigh the information imparted to the storage element.

A wide range of electric field conditions can be used in the process of this invention. The field may be applied from a D.C. source of potential such as a battery or from an A.C. source of potential. The response of photoconductive powder layers to radiation is strongest when a combination of an A.C. field with a frequency of less than 100 cycles per second and a D.C. bias field is used. The strength of the electric field is determined primarily by the breakdown strength of the binders used. The amount of stored energy emitted as yellow-orange light is increased by using fields as high as 100,000 volts per centimeter, and increases superlinearly with field strength.

The term "electric field" is well known in the art to describe the action of electrical forces exhibiting a potential gradient, i.e., a change of potential, or voltage, per unit distance. The magnitude of an electric field is herein expressed as field strength but is also called field intensity or simply electric field.

The radiation sources which subsequently discharge part of the stored energy by irradiating the photoconductive cells that control the electric field applied to the luminescent storage phosphor are determined by the response of the photoconductor employed. These might include all the pre-irradiation sources described above and in addition, light sources of wave-lengths longer than 5,000 A. including visible light and infrared radiation.

It is not essential that the pre-irradiation and playback from the storage phosphor occur at the same location as described in Examples I and II. The flexible storage phosphor element, for example, can pass over a photoconductive head with the pre-irradiation step at one location and the playback at other locations (see Example III).

Additional advantage may be obtained if the playback speed is greater than that of the recording speed. This increases the emission intensity or release of stored energy per unit time and increases the viewing contrast. Thus the threshhold of detection is effectively lowered, and the sensitivity of the process increased.

The element may be operated in ordinary room light if precautions are taken to insure that the storage phosphor and the photoconductor are protected from unwanted exposure. If such exposure does take place, false information will be stored and then released when the playback is made. Information is not appreciably discharged by stray radiation, even infrared light. A useful procedure is to pre-irradiate and impose an image in the dark and to transport the storage phosphor element to a location strongly lit by tungsten, mercury vapor sources or daylight where the playback can be viewed through a Wratten No. 8 gelatin (K2) or similar filter. The filter serves to prevent the incidence of exciting radiation in the room light spectrum upon the storage element either just before or at the instant of viewing the release of the stored energy.

The playback step may consist of a strong, uniform irradiation of the photoconductor, or the application of an electric field to the storage phosphor, either with or without the photoconductor in series with it. For example, if the flexible tape element is used, the photoconductor cell is not present at the playback point; it is therefore preferred to use the electric field type playback.

The flash of visible light upon image release may be utilized in many ways. It may be observed by an operator as a signal to perform some task. It may energize a photoelectric device which transfers the signal according to well known procedures. It may be used in light amplification, oscilloscope recording and in the temporary or emergency standby type computer memory system. It also may be used in oscillograph recording where light strikes a tape and forms a visible record which can first be inspected by a partial release of stored energy, and later transferred to a permanent film record.

The storage phosphor-photoconductor combination has the advantage of wider spectral response than the storage element alone, the range being sufficient to match the input to the output wavelength or even to use infrared light to produce yellow light. In addition, the photoconductor need not be operated during the storage period, resulting in a power saving. Successive images can be stored and displayed quickly. The flexible tape form is especially advantageous since a single photoconductor cell may serve many storage elements. Of course, the insensitivity of the storage elements, as in Assignee's Wahlig application, to yellow, red, and infrared light permits simple operation in ambient roomlight with very little optical filtration necessary.

As many apparently widely different embodiments of this invention may be made without departing from the spirit and scope thereof, it is to be understood that this invention is not limited to the specific embodiments thereof except as defined in the appended claims.

What is claimed is:

1. A method for image storage and release which comprises pre-irradiating a layer of storage phosphor which is connected in series with a photoconductive cell to a source of electrical potential, subsequently discharging from the phosphor a part of the pre-irradiated stored energy by irradiating the photoconductive cell, and thereafter increasing the applied potential to the photoconductive cell and storage phosphor in series causing a release of the remaining stored energy from the phosphor in the form of a negative image of the irradiation incident on the photoconductive cell.

2. A method for image storage and release which comprises pre-irradiating a layer of storage phosphor in a binder material which is connected in series with a photoconductive cell to a source of electrical potential, subsequently discharging from the phosphor a part of the pre-irradiated stored energy by imposing a pattern of irradiation on the photo-conductive cell, such discharge being a positive image of that pattern incident on the photoconductive cell, and thereafter increasing the applied potential to the photoconductive cell and storage phosphor in series causing a release of the remaining stored energy from the phosphor in the form of a negative image of the pattern of irradiation incident on the photoconductive cell.

3. A method for image storage and release utilizing a structure wherein a transparent, electrically conductive layer connected to a source of electrical potential is coated with a layer of storage phosphor having an opaque, current-diffusing layer thereover, a photoconductive layer thereover connected to said electrical source, which comprises pre-irradiating the layer of storage phosphor, subsequently discharging from the storage phosphor a part of the pre-irradiated stored energy by imposing a pattern of irradiation on the photoconductive layer, such discharge being a positive image of that pattern incident on the photoconductive layer, and thereafter increasing the applied potential to the structure causing a release of the remaining stored energy from the phosphor in the form of a negative image of the pattern of irradiation incident on the photoconductive layer.

4. A method for image storage and release which comprises pre-irradiating an area of a thin, flexible transparent tape having a layer of storage phosphor coated thereon at one location; transporting said tape area to a second location where an opaque current-diffusing layer coated thereover with a photoconductive layer, is placed in contact with the storage phosphor layer of the tape area, an electrical potential is applied across the layers electrically in series with each other, discharging from the phosphor a part of the pre-irradiated stored energy by imposing a pattern of irradiation on the photoconductive layer, such discharge being a positive image of that pattern incident on the photoconductive layer; transporting said tape area to a third location where an increased electrical potential is applied across the layer of storage phosphor causing a release of the remaining stored energy from the phosphor in the form of a negative image of the pattern of irradiation imposed on the photoconductive layer at the second location.

References Cited in the file of this patent
UNITED STATES PATENTS

| | | |
|---|---|---|
| 2,742,631 | Rajchman et al. | Apr. 17, 1956 |
| 2,743,430 | Schultz et al. | Apr. 24, 1956 |
| 2,836,766 | Halsted | May 27, 1958 |

OTHER REFERENCES

Kazan: "An Improved High-Gain Panel Light Amplifier," Proceedings of the I.R.E., October 1957, pages 1358 to 1364.